MATRIX FOR READING OUT STORED DATA

Filed March 30, 1959 2 Sheets-Sheet 1

INVENTOR.
JOSEPH CARL LOGUE
BY Darby & Darby
ATTORNEYS

AND LOGIC FOR SWITCHING ELEMENTS 50 FOR READ OUT OPERATION

FIRST LEVEL MATRIX SECOND LEVEL MATRIX

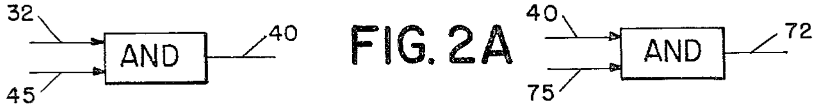
FIG. 2A

SWITCHING ELEMENTS 50 FOR READ OUT OPERATION

FIRST LEVEL MATRIX SECOND LEVEL MATRIX

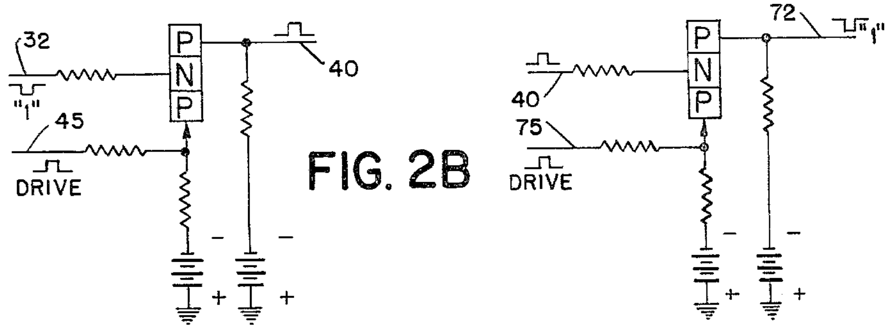
FIG. 2B

AND LOGIC FOR SWITCHING ELEMENTS 50 FOR WRITE OPERATION

FIRST LEVEL MATRIX SECOND LEVEL MATRIX

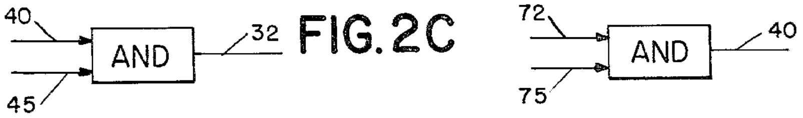
FIG. 2C

SWITCHING ELEMENTS 50 FOR WRITE OPERATION

FIRST LEVEL MATRIX SECOND LEVEL MATRIX

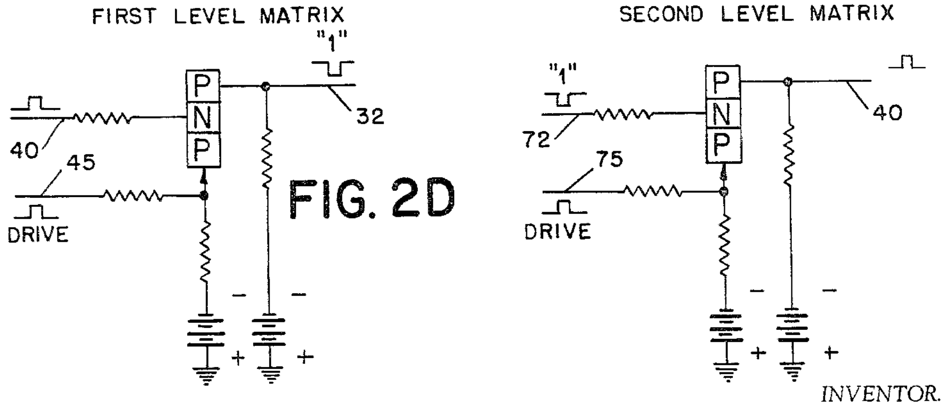
FIG. 2D

INVENTOR.
JOSEPH CARL LOGUE
BY Darby & Darby
ATTORNEYS 3,229,253

MATRIX FOR READING OUT STORED DATA

Joseph Carl Logue, Poughkeepsie, N.Y., assignor to International Business Machines Corporation, New York, N.Y., a corporation of New York Filed Mar. 30, 1959, Ser. No. 802,693
10 Claims. (Cl. 340—166)

This invention relates to a data handling system and more particularly to a data handling system which uses a two-level matrix selection network.

In information handling systems it is often desirable to transfer bits of information from one location to another. A typical example of such a data transfer operation occurs in digital computer systems where information is transferred from a main storage register, where it is stored in a plurality of storage elements, to an intermediate buffer storage register. Another typical example of data transfer is from a main or buffer storage register to an output utilization device such as a printer or a magnetic tape storage apparatus.

In data transfer operations of this type, the usual procedure followed is that a predetermined number of selected BITS of information, called a BYTE, of the total number of bits of information stored in the register, called a WORD, is READ OUT from the storage register and transferred to another location. A byte is defined as a segment of information consisting of a predetermined number of bits of information which are consecutively located in the word. In some instances, it is desirable to perform the reverse operation and WRITE, or place, a byte of information in to a particular location in the register.

One well known way of accomplishing the data selection and transfer operation is by the use of a matrix selection network which is connected to the storage register. The matrix selection network comprises a matrix which is connected to the storage elements in the register and a switching circuit which selects the particular portion of the matrix which is to be utilized. A typical matrix has a number of column lines which are connected to the storage elements in the storage register and a number of row lines which are connected to an output utilization device, or else to a second storage register, to which the data from the first storage register is to be transferred. The row lines intersect the column lines and a switching element is located at each intersection of a row and a column line to provide selective access to the storage elements of the register.

A number of diagonal lines, also called control lines, or drive lines, are interleaved across the intersections of the row and column lines. The diagonal lines are placed in such a manner that they are electrically connected to a number of matrix switching elements equal to the number of bits contained in a byte. The number and placing of the diagonal lines is such that a byte of information may be read out of or written into the register beginning at any particular bit, merely by the selection of the proper diagonal line.

The particular diagonal line selected, and hence the particular bit at which the byte begins, is determined by an ADDRESS which is supplied to the switching circuit of the matrix selection network from an external source. The type of matrix selection network just described is called a single-level matrix since only a single matrix and selection of a single diagonal line is necessary.

While the selection of a byte, beginning at any bit in the word stored in the register, may be accomplished by the single-level matrix, its use is uneconomical since a switching element is required at each intersection of a row and a column line. The total number of switching elements needed in a single-level matrix is therefore equal to the product of the number of row lines and the number of column lines. It is readily recognizable that the number of switching elements required for the single-level matrix selection network greatly increases as the storage capacity of the register is increased and a point is reached where the register storage capacity makes the use of a single-level matrix selection network uneconomical from the standpoint of the number of switching elements needed.

In the present invention, the number of matrix switching elements needed for a data transfer system, in which a byte sized segment of information to be selected, is substantially reduced by the use of a two-level matrix selection network. In the two-level matrix arrangement, a first-level matrix is provided with column lines which are connected to the storage elements, which store the bits of information, located in the storage register. Row lines are also provided in the first-level matrix which intersect the column lines of the first-level matrix. These row lines are also connected to an equal number of row lines of a second-level matrix. Diagonal lines are also provided which link particular intersections of row and column lines. At each of the intersections of a row line, a column line and a diagonal line, a switching element is provided to store a bit from the register. The diagonal lines of the first-level matrix are so located so that when a particular diagonal line is energized, the information of a number of consecutive bits, which is greater than the number of bits in a byte, is read out of the switching elements and placed on the row lines of the first-level matrix, and hence also on the row lines of the second-level matrix. The desired byte is separated from the total number of bits which appear on the row lines, beginning at any bit position of the total number of bits by the second-level matrix.

As previously pointed out, the second-level matrix has a number of row lines which is equal to and connected with the row lines of the first-level matrix. The second-level matrix also has a number of column lines which is equal to the size of the byte which is to be selected. These column lines intersect with the second-level matrix row lines and are connected to an output utilization device, or else to another storage register from which information is to be transferred to the storage register in question. The second-level matrix also has a number of diagonal lines which are located on the second-level matrix so as to link with a number of intersections of row and column lines which is equal to the byte size. A switching element is provided at each intersection of a column line, a row line and a diagonal line which stores the bits of information which were transferred on the row lines. By selecting and energizing the proper diagonal line, the selected byte may be separated and read out from all of the bits transferred to the switching elements of the second-level matrix. In the two-level matrix system a single address is provided which contains information which determines the diagonals to be selected and energized in both the first-level and the second-level matrix.

It is therefore an object of this invention to provide a novel data transfer system.

Another object of this invention is to provide a data transfer system which utilizes a two-level matrix selection network.

Yet another object of this invention is to provide a data transfer system which uses a two-level matrix selection network in order to reduce the number of switching elements needed.

Other objects of the invention will be pointed out in the following description and claims and illustrated in the accompanying drawings, which discloses, by way of examples, the principle of the invention and the best mode, which has been contemplated, of applying that principle.

In the drawings:

FIGURES 2A and 2C show the logic blocks for the switching elements of the first and second level matrices for respective read out and write operations; and FIGURES 2B and 2D are schematic diagrams of one form of circuit which may be utilized as the switching elements for the first and second level matrices for respective read out and write operations.

Figure 1:
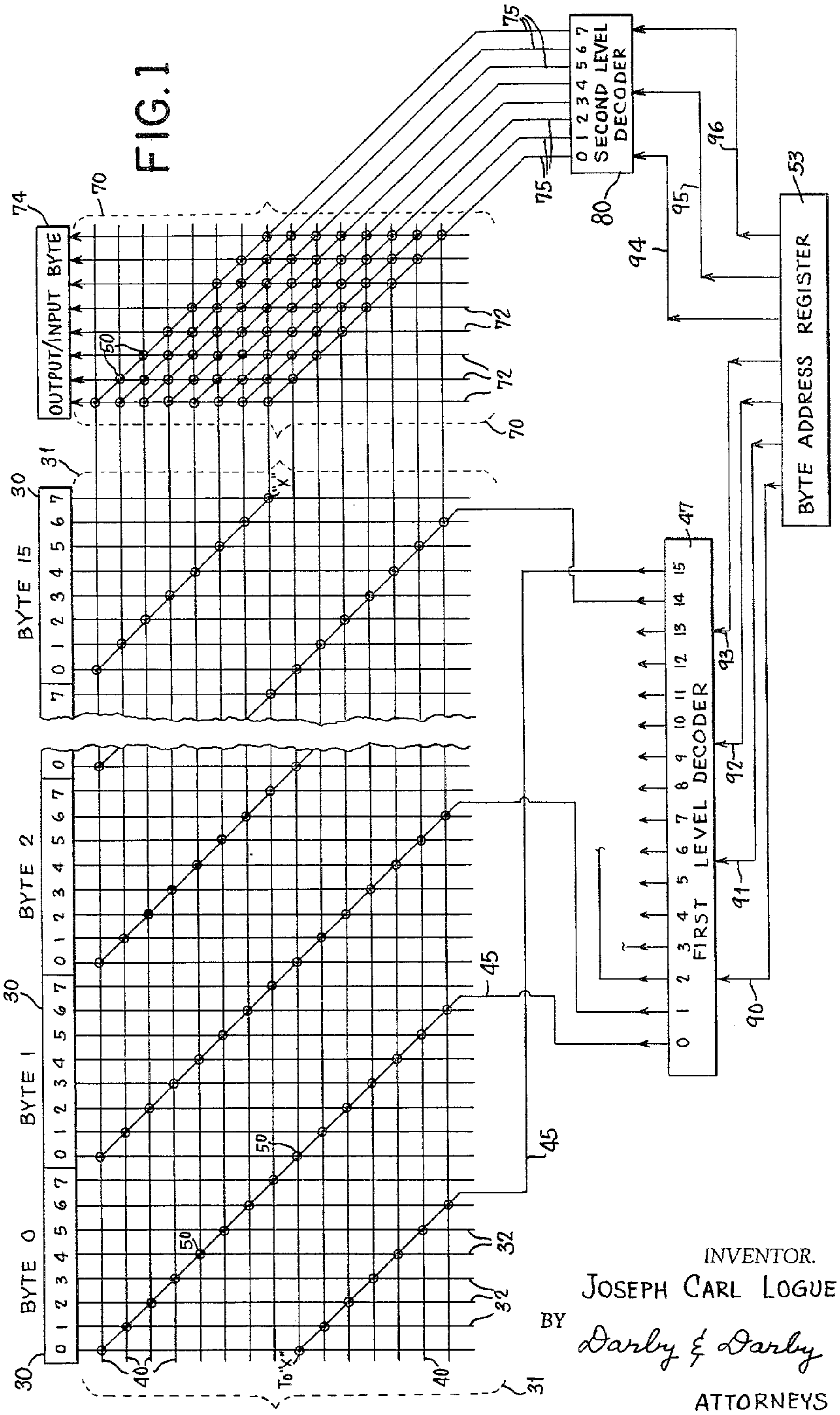
FIGURE 1 shows a schematic diagram of the two-level matrix selection-network.

Referring to FIGURE 1, a storage register 30 from which data is to be transferred is shown. In the preferred embodiment illustrated, the register 30 stores a word consisting of 128 bits of information. The word comprises a number of byte size segments, which are designated as byte 0, byte 1, byte 2 . . . byte 15. Each of the bytes 0–15 contains eight bits of information, designated as bit 0, bit 1, bit 2 . . . bit 7. The bits of information are transferred to the storage register 30 from a main storage register, or else the register 30 may itself be considered the main register, and are each representative of a binary digit, i.e., a 1 or a 0. The bits of all the bytes are stored in the register 30 by suitable bistable storage elements such as transistor or the like flip-flop circuits (not shown). These elements are well known in the art and need no further description here. While a register 30 which contains a total of 128 bits is shown, it should be realized that the present invention may be used with any type of a register which stores any number of bits of information.

The first-level matrix 31 is formed by a number of separate column lines 32 which are connected to the storage elements of the storage register 30. There is a column line 32 for each storage element and since, in the embodiment shown, there are 128 storage elements to store the 128 bits of information, there are 128 column lines 32. A suitable driver device may be provided between each register storage element and a column line 32, if desired.

The first-level matrix 31 also has a number of row lines 40 which intersect all of the column wires 32. The row lines 40 extend beyond bit 7 of byte 15 of the first-level matrix 31 and serve as the row line for a second-level matrix 70, as will be described.

A plurality of diagonal lines 45, also called control lines or drive lines, are also provided in the first-level matrix 31. In the embodiment shown, there are as many diagonal lines 45 as there are bytes of information stored in the storage register 30. As shown, there are sixteen diagonal lines 45, since there are sixteen bytes. One end of each of the diagonal lines 45 is connected to an output position of a first-level decoder 47, to be described later, which has sixteen output positions, designated as 0, 1, 2, 3 . . . 15. Each of the diagonal lines 45 intersects all of the row lines 40 and a predetermined number of the column line 32, here shown as fifteen. The diagonal lines 45, therefore, cross all of the column lines 32 connected to one byte and seven of the column lines connected to the next successive byte. The diagonal lines 45 are separated from one another by a second predetermined number of column lines 32, illustratively shown here as eight, which is equal to the number of bits in a byte.

The diagonal lines 45 are referred to as diagonal 0, diagonal 1, diagonal 2 . . . diagonal 15, in accordance with the designation given to the full byte, which has all of its column lines 32 intersected by the respective diagonal line. This designation also corresponds with the number of the output position of the first-level decoder 47, to which a diagonal line is connected.

Located at each intersection of a row line 40, a column line 32 and a diagonal line 45 is a switching element 50, which is schematically represented by the dots shown at each such intersection. It is the function of a switching element 50 to provide access to the bit of information which is present in the storage element of the register 30 to which it is connected. As seen, this connection is accomplished by means of a respective column line 32. The switching elements 50, of the first-level matrix, may be considered as AND circuits. When data flow is out of the register 30, the column lines 32 and the diagonal lines 45 serve as the inputs of the AND circuits, and the row lines 40 serve as the outputs (see FIGURE 2A). When data flow is into the register 30, the row lines 40 and the diagonal lines 45 serve as the inputs of the AND circuits and the column lines 32 serve as the outputs (see FIGURE 2C).

In a preferred embodiment of the invention, switching transistors are used for the switching elements 50. When data flow is out of the register 30, each of the transistor switching elements is so arranged at an intersection so that its base electrode is connected to the column line 32, its emitter electrode to the diagonal line 45, and its collector electrode to the row line 40. Switching circuits using transistors in similar environments are well known. To explain the operation of one such switching circuit, reference is made to FIGURE 2B which shows a PNP transistor for use at each intersection, connected as described above, with the conventional biasing voltage sources and input and output impedances. The presence of a binary 1 digit in the register storage element places a relatively negative signal on the transistor base electrode. In the absence of a positive drive, or gating, pulse on the diagonal line 45, the transistor is nonconducting and the collector electrode remains at the biasing potential. When the diagonal line is energized with the positive pulse, the transistor conducts and a positive pulse appears at its collector electrode. This pulse is therefore applied to the row line 40. If the storage element connected to the transistor base electrode stores a binary 0 digit, the transistor remains nonconducting upon application of the positive drive pulse. In this manner, an instantaneous data transfer or read out to the row lines is obtained of the data stored in the register storage elements associated with the column lines 32 located along the energized diagonal line 45.

If it is desired to write information into the register 30, the circuits for the switching elements 50 at each intersection are correspondingly modified.

FIGURE 2C shows the AND circuit logic for the switching elements with the inputs being lines 40 and 45 and the output being row line 32. Where transistors are used as the switching elements, the transistor at each intersection has its collector electrode connected to the column line 32, the base electrode to the row line 40, and the emitter electrode to the diagonal line 45. This is shown in FIGURE 2D. For the writing operation, another matrix of switching elements may be provided which is connected to the register 30. It should be realized that other circuit arrangements may be used for the switching elements 50 in both the read out and write operations which may utilize other circuit elements such as NPN transistors, vacuum tubes, magnetic cores, etc.

When a byte of information is to be transferred, or read out from the storage register 30, it is the function of the first-level matrix 31 to select the switching elements 50 which provide access to the consecutive bits of the desired byte. This is accomplished by energizing the diagonal line 45 along which the switching elements 50 which are associated with the bits forming the desired byte are located. When a diagonal line 45 is energized, the states of the register storage elements connected to the switching elements 50 located along the energized diagonal are read out and the information which is read out is transferred onto the row lines 40. The information selected or read out from register can be designated as $k$ bits corresponding to the $k$ switching elements connected to an energized diagonal.

In the embodiment of the invention shown, the byte size is designated as having $n$ bits. As can be seen, there are more than $k-n$ more switching elements 50 located along any diagonal line 45 than the size $n$ of the byte to be finally selected. The bits of information, representative of a binary 1 or 0, read out of the register storage elements, which are associated with the selected diagonal line 45, are carried over the row lines 40 to the second-level matrix 70. If desired, an amplifier or power driver may be connected on each of the row lines 40 between the first-level matrix 31 and the second-level matrix 70, for repowering purposes. In the illustrative embodiment shown, fifteen ($k$) switching elements 50 are located along the selected diagonal line 45. From the fifteen bits of information read out of the fifteen register storage elements by the first-level matrix 31, the eight ($n$) consecutive bits, located within the fifteen bits, forming the desired byte must be selected. This final selection is accomplished by the second-level matrix 70 as will be described.

It should be recognized that, due to the wiring arrangement of the first level matrix 31, a diagonal line 45 selects one full byte ($n$) bits plus seven bits ($k-n$) of the next adjacent byte from the storage register 30. This is necessary since the second-level matrix 70 can make a selection of a full 8 bit byte starting with any of the first eight ($k-n+1$) bit position of the 15 bits selected by the first-level matrix 31. Thus, the second-level matrix 70 may make a selection of the desired byte starting with the first bit of the 15 bits selected by the first-level matrix, i.e., the first bit of the full byte, or the 8th bit ($k-n+1$) of the 15, i.e., the last bit of the full byte. In the former case, all of the bits of the full byte selected from the register 30 are finally selected as the desired byte, while in the latter case, the last bit of the full byte and the 7 bits of the next adjacent byte are finally selected. This indicates the need for the selection of the extra 7 bits. Any final selection choice of the desired byte intermediate the two set forth above would require the selection of the proportionate share of the seven additional bits.

The second-level matrix 70 has a number of row lines 40, which are continuations of the row lines 40 of the first-level matrix 31. The second-level matrix 70 also has a number of column lines 72 which intersect the row lines 40. The number of column lines 72 of the second-level matrix 70 is equal to the desired byte size. One end of each of the column lines 72 is connected to an output/input means 74 to which, or from which, information is to be transferred.

The second-level matrix 70 also has a number of diagonal control lines 75. One end of each of the control lines 75 is connected to a second-level decoder 80, which is similar to the first-level decoder 47. The diagonal lines 75 are placed so that each one intersects all of the column lines 72 and a number of row lines 40, which is equal to the desired byte size. The diagonal lines 75 are separated from each other by one row line 40.

Located at each intersection of a row line 40, a column line 72, and a diagonal line 75, is a switching element 50, similar to the switching elements 50 of the first-level matrix 31, which are again schematically represented by the dots. The second level matrix switching elements 50 are also essentially AND circuits. When a switching element is to be used for read out, the AND logic is connected as shown in FIGURE 2A, with the inputs being lines 40 and 75 and the output being column line 72. For writing into the register 30 the AND logic is as shown in FIGURE 2C, with the inputs being in lines 72 and 75 and the output being on row line 40. When PNP transistors are used for the switching elements here, for a read out operation from register 30, the collector electrode is connected to the column line 72, the base electrode to the row line 40 and the emitter electrode to the diagonal line 75. This circuit is shown in FIGURE 2B. The operation of these PNP transistor switching elements is the same as previously described with respect to the switching elements of the first-level matrix. Here, in response to a positive drive pulse on diagonal line 75, and a positive pulse on a respective row line 40 a transistor produces a negative output signal on its respective row line 72, which is the same as the negative signal representative of a binary 1 read out of the register 30. The PNP transistor circuit for a writing function is shown in FIGURE 2D.

The desired byte is made to appear at the output/input means 74 by selecting and energizing the proper diagonal line 75 of the second-level matrix 70 at the same time the diagonal line 45 of the first-level matrix 31 is energized. This gates the information applied over the row lines 40 through the switching elements 50 which are located along the selected diagonal line 75 into the output/input means. The energization of the selected diagonal line 75 is affected in a manner similar to the energization of a diagonal line 45 of the first-level matrix 31. Since each diagonal line 75 is associated with only eight switching elements 50, only eight bits of information from the 15 originally selected are allowed to be read out to the output/input means 74 when a diagonal line 75 is energized. In this manner, the separation of the eight bits which form the desired byte, from the fifteen bits selected in the first-level matrix 31, is accomplished.

In order to energize the proper diagonal line, thereby selecting the desired byte, a byte address register 53 is provided. The byte address register 53 may be any suitable electrical or mechanical device which is capable of producing a number of binary information pulses, called address bits. The byte address register 53 may be operated in response to any suitable means, such as punched cards, magnetic tape, keyboard selection, etc., and for example, may comprise a number of flip-flop tubes which are arranged to produce the desired binary pulses.

As shown in the drawing, the byte address register 53 has seven output lines 90–96. Four of the output lines, 90–23, are connected to the input of the first-level decoder 47 and the last three output lines 94, 95 and 96 are connected to the input of the second-level decoder 80. The binary pulses, or address bits, produced on lines 90–96 are used to select the diagonal lines connected to the first-level decoder 47 and the second-level decoder 80 which are to be energized. If necessary, appropriate power drivers may be connected between the outputs of the first-level decoder 47 and the second-level decoder 80 and the diagonal drive lines for driving the group of switching elements associated with selected line. The first and second level decoders may comprise any suitable means, for example, a diode matrix arrangement. The four address bits which appear on lines 90–93 serve to select one of the sixteen output positions of the first-level decoder 47 at which an output pulse is to be produced. The output pulse which is produced at the selected output position is used to energize the diagonal line 45 which is connected to it. Since there are four address bits appearing at the input of the first-level decoder 47, sixteen output positions may be selected. This follows because the number of output positions of a decoder is equal to $2^X$, where X equals the number of input bits. In this instance, since X is equal to 4, the decoder has sixteen possible output positions.

The second-level decoder 80, simultaneously with the first-level decoder 47, receives three address bits over input lines 94, 95 and 96, and is capable of producing an output at a selected one of its eight positions. In this manner, the diagonal line 75 which is connected to the selected output of the second-level decoder 80 is energized. This size of the byte address register and the first and second-level decoders may be expanded or contracted in order to accommodate any type or size of two-level matrix system. For a discussion of components which may illustratively be used to form the byte address register 53 and the first and second-level decoders 47 and 70 reference is made to "Digital Computer Components & Circuits" by R. K. Richards, published by D. Van Nostrand Company, Inc., Princeton, N. J., 1957. For example, the decoders 47 and 70 may be formed by respective sixteen output lines and eight output lines diode matrices, such as those described on pages 56–59 of the Richard's, text. As stated on page 58 of Richard's, the input potentials for the diodes may be obtained from flip-flops which would form the byte address register 53.

To illustrate the operation of the two-level matrix system of the present invention, consider a situation where an eight bit byte of information is to be selected from the storage register 30 beginning at bit 6 of byte 0 and ending at bit 5 of byte 1. The storage elements of the register 30 which contains these bits of information are connected to the switching elements 50 which are located along the diagonal 0 line. The diagonal 0 line, as can be seen, is associated with fifteen switching elements 50 which have the information of the bits stored in the register 30 from bit 0 of byte 0 through bit 6 of byte 1. Information is fed into the byte address register 53 of a nature so that the proper address bits appear on the output lines 90–93 to produce an output pulse at output 0 of the first-level decoder 47. The output pulse produced energizes the diagonal 0 line, which is connected to the 0 output position. When the diagonal 0 line is energized, the information which is present in the switching elements 50 located along it is read out and carried down the row lines 40 to the switching elements 50 of the second-level matrix 70. The byte address register 53 simultaneously produces address bits on the output lines 94, 95 and 96, which are supplied to the second-level decoder 80. As can be seen, it is the function of the second-level decoder 80 to select and energize a diagonal line 75 which crosses only the row lines 40 which are associated with the switching elements 50 to which information from bit 6 of byte 0 to bit 5 of byte 1 is supplied. In this instance, the second-level decoder 80 would be supplied with address bits from the byte address register 53 so that diagonal 1 would be selected and energized. When diagonal 1 of the second-level matrix 70 is energized, the selected bits of information are gated through the switching elements 50 onto the column lines 72 and into the output/input means 74, where they are utilized by a suitable device.

In a similar manner, a byte of information may be selected and read out of the register 30 starting at any bit position therein. All that is necessary is to supply the proper address bits to the first and second-level decoders 47 and 80, thereby selecting and energizing the proper diagonal lines in the first and second level matrices. If desired, two separate sets of first and second-level matrices may be provided. The first set would have the switching elements 50 wired for a read operation and the second set would be wired for a write operation.

In order to write a byte of information into the storage register 30, the reverse process is followed. In this case, the switching elements 50 of the second-level matrix 70 would be connected like the transistor switching elements of the first-level matrix 31 during a read operation, i.e., the collector to the row line 40, the emitter to the diagonal line 75 and the base to the column line 72. The transistor switching elements of the first-level matrix would be connected like the switching elements of the second-level matrix 70 during a read operation. In this instance, the byte of information is inserted from the output/input means 74 onto the column lines 72 of the second-level matrix 70. A bit of information, contained in the inserted byte, is applied to the input of the switching element 50, which is associated with the respective column line 72 to which the bit is applied. The energization of one of the diagonal lines 75 of the second-level matrix 70, causes the bits of information applied to the inputs of the switching elements 50 which are located along that diagonal to be gated onto the associated row lines 40 and applied to the inputs of the switching elements 50 of the first-level matrix 31.

In order to write the byte information into the desired part of the storage register 30, it is only necessary to supply the proper address bits to the first-level decoder 47 so that the correct diagonal line 45 may be energized. When this is done, the bits which are applied to the first-level matrix switching elements 50 are gated onto the column lines 32 and into the storage elements of the register 30.

To illustrate the operation of the two-level matrix system of the present invention where bits of information are to be written into the storage register 30, consider the following example where it is desired to insert an eight bit byte into the storage register 30 beginning at bit 2 of byte 1 and ending at bit 1 of byte 2. In this instance, the bits of the byte are applied to the column lines 72 of the second-level matrix 70. Address bits of such a nature are fed from the byte address register 53 to the second-level decoder 80, so that diagonal 5 of the second-level matrix 70 is energized with a gating pulse. The bits of information which are gated through the switching elements 50 located along diagonal 5 are transferred only along the third to the tenth row lines 40 and applied to the inputs of the switching elements 50 of the first-level matrix 31. To write the byte into the storage register 30 beginning at bit 2 of byte 1, address bits are supplied from the byte address register 53 to the first-level decoder 47 so that diagonal 1 of the first-level matrix 31 is energized. When diagonal 1 is energized, the bits of information applied to the inputs of switching elements 50 which are located along it are gated onto the column lines 32 and written into the storage elements of the register 30 beginning at bit 2 of byte 1 and ending at bit 1 of byte 2. Bytes of information may be written into the storage register 30 beginning at any bit in a similar manner by selecting and energizing the proper diagonal lines of the first and second-level matrices.

In the illustrative embodiment shown, the two-level matrix system selects an eight bit byte and fifteen row lines 40 and a single first-level matrix diagonal line 45, which is associated with a number of switching elements 50 which is greater than the number of bits contained in the byte, are utilized to accomplish the result. Other arrangements of the two-level matrix selection network may be provided wherein the byte size is different, or where the number of row lines is changed, or where more than one diagonal line is used to select the requisite number of switching elements for a byte. In designing such systems, the major object is to minimize the number of switching elements needed. In order to aid in the design of such systems, the following relationships are given.

The number of row lines required may be expressed by the following equation:

$$N=n/m-1$$

where

N=number of row lines needed
$n$=number of bits per byte
$m$=number of diagonals per byte .

The number of switching elements needed in the first-level matrix is proportional to N $m$ B, where B is the number of bytes per word.

The number of switching elements needed in the second-level matrix is proportional to $n/m^2$.

These relationships give a certain degree of flexibility in the design of the two-level matrix selection network in order to minimize the number of switching elements which are needed.

Therefore, it is seen that a two-level matrix selection network has been provided, to read information out of, or to write information into a storage register, in which the total number of switching elements needed for the matrix has been considerably reduced over prior art types of matrix selection systems. It should be realized that the two-level matrix system of the present invention is not limited in use to any particular size word or byte or with any particular type of storage register, but that the system may be suitably arranged for use with any size byte located in any size or type of register.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

I claim:

1. Apparatus for handling bits of information in fixed size groups of $n$ bits which are stored by the storage elements of a storage register comprising first selecting means, said first selecting means arranged in a number of column lines which are electrically connected to said storage elements and a number of row lines and control lines which intersect selected ones of said column lines, a switching element electrically connected to said row, column and control lines at selected intersections thereof, each of said switching elements representing the bit of information which is stored in the register storage element connected to its associated column line, means for selecting and energizing one of said control lines to read out the bit representing information from the group of switching elements which are electrically connected to the selected control line and applying the read-out signals to the corresponding connected row lines, the number of switching elements in said group being $k$ which is a number greater than the number $n$, and the second selecting means electrically connected to said row lines for selecting a desired fixed size group of $n$ bits of information from the bit representing information read out of said group of switching elements starting at any of $k-n+1$ bit positions within said read out bit representing information.

2. Apparatus for handling bits of information in fixed size groups of $n$ bits which are stored by the storage elements of a storage register comprising first selecting means, said first selecting means arranged in a number of column lines which are electrically connected to said storage elements and a number of row lines and control lines which intersect selected ones of said column lines, each control line intersecting a predetermined number of column lines which is greater than the number $n$, a switching element electrically connected to said row, column and control lines at each intersection thereof, each of said switching elements representing the bit of information stored in the register storage element electrically connected to its associated column line, means for selecting and energizing one of said control lines to read out the bit representing information from the group of switching elements which are electrically connected to the selected control line and applying it to the corresponding electrically connected row lines, the number of switching elements in said group being $k$ which is a number greater than $n$ greater than the number $n$, and second selecting means electrically connected to said row lines for selecting a fixed size group of $n$ bits of information from the bit representing information read out of said group of switching elements starting at any $k-n+1$ bit positions within said bit representing information.

3. Apparatus for handling bits of information comprising: first selecting means, said first selecting means including a number of column lines for receiving the bits of information and a number of row lines and control lines which intersect said column lines, a switching element electrically connected to said row, column and control lines at selected intersections thereof for storing the bit of information received on a respectively connected column line, each control line having $k$ switching elements connecting thereto means for reading out the $k$ bits of information stored in the switching elements electrically connected to a selected control line and for applying the read out bits to the respectively connected row lines; a second selecting means, said second selecting means including a number of column lines, a row line connected to each first selecting means row line having a switching element connected thereto, and a plurality of control lines which intersect selected ones of said second selecting means row and column lines, a switching element electrically connected to said row, column and control lines of said second selecting means at selected intersections thereof for storing the bit of information read out of the switching element on the corresponding connected row line of the first selecting means, each control line of the second selecting means having $n$ switching elements connected thereto, where $n$ is a number less than $k$, said row lines of said second selecting means thereby causing the switching elements of said second selecting means electrically connected thereto to represent the bits of information read out of the corresponding switching elements on the corresponding row lines of said first selecting means, and means for selecting and energizing a control line of said second selecting means to read out the bit representing information from the said second selecting means switching elements onto associated column lines of said second selecting means.

4. Apparatus for handling information words in data groups of $n$ bits comprising: a first selecting means arrayed in column line, row lines and control lines, each control line intersecting $k$ selected ones of each of said row lines and said column lines, a switching element connected to each intersection of said row, column and control lines for storing a bit representing signal of an information word, means for reading out the group of $k$ bit representing signals stored in a group of switching elements connected to a predetermined control line, the read out bit representing signals appearing on the row lines of said first selecting means connected to said group of switching elements, said read out group of $k$ bit representing signals being greater in number than the data group of $n$ bits; a second selecting means having at least $n$ column lines, a row line connected to each row line of said first selecting means having a switching element connected thereto, and a plurality of control lines intersecting $n$ of said column lines and $n$ of said row lines, a switching element connected to each intersection of said second selecting means, row, column and control lines for storing the bit representing the signal of the $k$ bit representing signals read out of the first selecting means switching element connected to the corresponding second selecting means row line, means for reading out the group of $n$ bit representing signals stored in the switching elements connected to a predetermined one of said control lines in said second selecting means and to apply the read out bits to the associated column lines of said second selecting means thereby effectively selecting a group of $n$ bits starting at any bit position of said information word.

5. Apparatus for handling information words in groups of $n$ bits comprising: a first selecting means arranged in column lines, row lines and control lines, each control line intersecting all of said row lines and a first predetermined number $k$ of said column lines which is greater than the number $n$, a switching element operatively connected to said first selecting means row, column and control lines at each intersection thereof, means for applying the bit representing signals of a word to the column lines of said first selecting means, a bit representing signal of the word being stored in the respective switching element connected to the corresponding column line, means for reading out the $k$ bit representing signals stored in the switching elements connected to a predetermined one of said control lines, the read out bit representing signal from each switching element connected to the control line appearing on the respectively connected row line of said first selecting means; a second selecting means arrayed in column lines, row lines and control lines, said second selecting means column lines being at least equal in number to said value $n$, said row lines being equal in number to the row lines of said first selecting means, and each second selecting means control line intersecting all of said column lines and $n$ of said row lines, a switching element for storing a bit of information connected to said second selecting means row, column and control lines at each intersection thereof, means for electrically connecting the row lines of said first selecting means to the corresponding row lines of said second selecting means, each bit representing signals read out of the switching elements of the first selecting means being stored in the switching element of the second selecting means connected to the row line on which the bit appears, means for reading out the bit representing signals stored in the $n$ switching elements connected to a predetermined one of the control lines of said second selecting means, the $n$ bit representing signals from the said $n$ switching elements connected to said predetermined control line of said second selecting means appearing on the column lines respectively connected to said switching elements.

6. Apparatus for handling information words in groups of $n$ bits comprising: a first level selection matrix arrayed in column lines, row lines and control lines, each control line intersecting all of said row lines and a first predetermined number $k$ of said column lines, where $k$ is a number greater than $n$, each control line being separated by a second predetermined number of said column lines, a switching element for storing a bit of information operatively connected to the row, column and control lines at each intersection thereof, means for applying the bit representing signals of a word to the column lines of said first level selection matrix, each bit of the word being stored in the switching element connected to the corresponding one of said column lines, first addressing means connected to said control lines for applying a signal to a predetermined one of said control lines to read out the $k$ bit representing signals stored in the switching elements connected to the control line receiving the read out signal, the read out bit representing signal from each switching element appearing on the respectively connected row line of said first matrix; a second level selection matrix arrayed in column lines, row lines and control lines, said second level matrix column lines being at least equal in number to said value $n$, said second level matrix row lines being equal in number to the row lines of said first matrix, each control line of said second matrix intersecting $n$ of said second matrix column lines and $n$ of said row lines, adjacent control lines being separated from each other by one row line, a switching element for storing a bit of information operatively connected to said second level matrix row, column and control lines at the intersections thereof, means for electrically connecting the row lines of said first matrix to the corresponding row lines of said second matrix, each of the $k$ bit representing signals read out of said first matrix and appearing on the row lines thereof being stored in the switching element connected to the corresponding one of the row lines of said second matrix, second addressing means connected to said second level matrix control lines for applying a signal to a predetermined one of said control lines in said second matrix to read out the bit representing signals stored in the switching elements connected to the control line receiving the read out signal, the bit representing signals read out bit from each switching element of the second matrix appearing on the respectively connected second matrix column lines thereby producing on said column lines a selected group of $n$ bits starting at any position of the information word.

7. Apparatus for transferring the bits of a data word stored in a register to a utilization device in fixed size groups of $n$ consecutive bits comprising first selection means for reading out in parallel a first group of $k$ bits of said data word of a number greater than $n$ and including a desired fixed size group of $n$ consecutive bits to be transferred to said utilization device, second selection means connected to said first selection means for reading out in parallel from said first group of bits a desired fixed size group of $n$ consecutive bits for transfer to said utilization device starting at of $k-n+1$ any bit portions within said first group.

8. Apparatus for handling data stored in a register as consecutive bit data words in fixed size groups of $n$ consecutive bits for transfer to utilization means comprising: a register for storing bits of data, first selection means connected to said register for simultaneously reading out from said register a first group of consecutive bits of data of a number $k$ greater than $n$ and including a desired group of $n$ bits to be transferred, utilization means, and second selection means connected between said first selection means and said utilization means for selecting from the $k$ consecutive bits of said first group starting at any of $k-n+1$ bit positions of said first group a fixed size group of $n$ consecutive bits for transfer to said utilization means.

9. Apparatus for transferring desired data from a stored data word to a utilization means in groups of bits in which the number of bits in a group is less than the number of bits in the stored data word and with the desired data being shifted a predetermined number of bits with respect to the beginning of the stored data word comprising:

(a) means for storing a data word formed by a plurality of bits of information,
(b) utilization means,
(c) means connected between said storing means and said utilization means for selecting out therefrom groups of bits starting at any bit position within the stored data word,
(d) means connected to said selecting means to control the operation of the same to select for transfer to said utilization means a first group of bits from said storing means starting said predetermined number of bits from the beginning of the stored data word and at any bit position within said data word and to successively select adjacent groups of bits within said stored data word, and
(e) means connected to said selecting means and said utilization means for transferring the selected groups of bits to said utilization means.

10. Apparatus for transferring desired data from a stored data word to a utilization means in groups of bits in which the number of bits in a group is less than the number of bits in the stored data word and with the desired data being shifted a predetermined number of bits with respect to the beginning of the stored data word comprising:

(a) means for storing a data word formed by a plurality of bits of information stored in a series arrangement,
(b) utilization means,
(c) means connected to said storing means for selecting out in parallel therefrom groups of serially arranged bits starting at any bit position within the stored data word,
(d) means connected to said selecting means to control the operation of the same to select for transfer to said utilization means a first group of bits from said storing means starting said predetermined number of bits from the beginning of the stored data word and to successively select adjacent groups of serially arranged bits from said data word, and
(e) means connected to said selecting means and said utilization means for transferring the selected groups of bits to said utilization means.

(References on following page)

References Cited by the Examiner

UNITED STATES PATENTS

| | | | |
|---|---|---|---|
| 2,424,243 | 7/1947 | Lowell | 340—147 |
| 2,428,811 | 10/1947 | Rajchman | 340—166 X |
| 2,651,718 | 9/1953 | Levy | 340—147 |
| 2,884,622 | 4/1959 | Rajchman | 340—147 |
| 2,913,706 | 11/1959 | Thorensen | 340—166 |
| 3,013,251 | 12/1961 | Wright | 340—166 X |

OTHER REFERENCES

"Description of a Relay Calculator," by Harvard University Computation Laboratory, 1949, pp. 43 and 44.

"The Design of Switching Circuits," by Keister et al., 1951, pp. 217, 218 and 480.

NEIL C. READ, *Primary Examiner.*

EDWING R. REYNOLDS, IRVING L. SRAGOW, *Examiners.*

K. E. JACOBS, L. A. HOFFMAN, H. I. PITTS, *Assistant Examiners.*